United States Patent [19]
Odawara et al.

[11] Patent Number: 4,916,684
[45] Date of Patent: Apr. 10, 1990

[54] HEAD DRIVE ARRANGEMENT FOR A DATA REPRODUCING APPARATUS

[75] Inventors: Kazuharu Odawara, Yokohama; Masaru Ishii, Fujisawa; Nobuo Inage, Tokyo, all of Japan

[73] Assignee: Kabushiki Kaisha Toshiba, Kanagawa, Japan

[21] Appl. No.: 56,903

[22] Filed: Jun. 3, 1987

[30] Foreign Application Priority Data

Jun. 13, 1986 [JP] Japan ................................ 61-137882

[51] Int. Cl.$^4$ ......................... G11B 7/00; G11B 21/02
[52] U.S. Cl. ........................................ 369/43; 369/44; 369/215; 369/219; 360/101; 360/107
[58] Field of Search .................... 358/342; 360/75, 77, 360/78, 101, 86, 97, 107, 98, 99, 69; 369/43, 44, 33, 32, 215, 219

[56] References Cited

U.S. PATENT DOCUMENTS

| 3,867,724 | 2/1975 | Bruer et al. ........................... 360/97 |
| 3,882,317 | 5/1975 | Camerik et al. . |
| 4,481,613 | 11/1984 | Yokota . |
| 4,564,872 | 1/1986 | Oda et al. ............................. 360/78 |
| 4,590,529 | 5/1986 | Nikaido et al. ..................... 360/106 |
| 4,736,263 | 4/1988 | Takahashi et al. ................... 360/97 |
| 4,751,694 | 6/1988 | Naito et al. ........................... 369/46 |

*Primary Examiner*—Robert L. Richardson
*Attorney, Agent, or Firm*—Finnegan, Henderson, Farabow, Garrett and Dunner

[57] ABSTRACT

A disc data reproducing apparatus, including a rotating mechanism for rotating the disc about a central axis, an optical head disposed opposite the disc for receiving data from the disc, and a moving mechanism for moving the optical head along the radial direction of the disc. The optical head is disposed on one side of the central axis of the rotating mechanism and the moving mechanism is disposed on the other side of the central axis so as to reduce the space requirements for housing the head and moving mechanism within the apparatus.

8 Claims, 5 Drawing Sheets

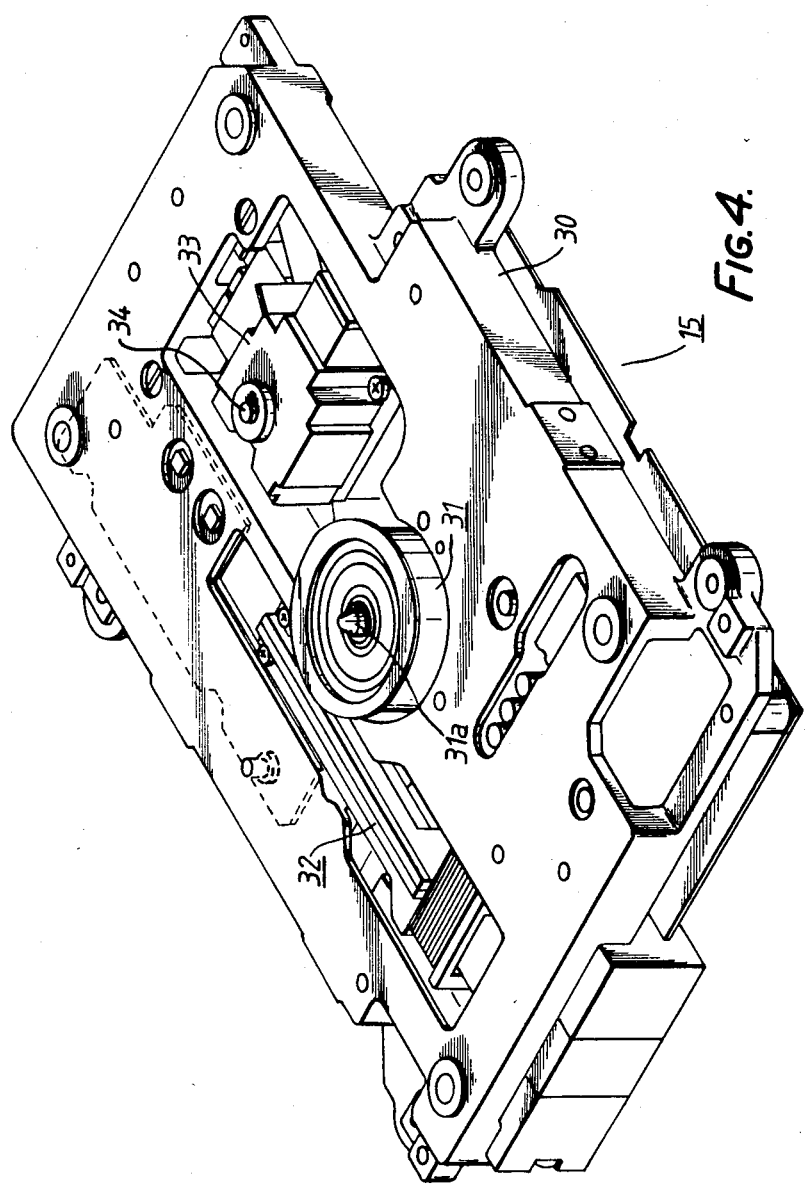

HEAD DRIVE ARRANGEMENT FOR A DATA REPRODUCING APPARATUS

BACKGROUND OF THE INVENTION

1. Field of the Invention

The present invention relates to a data reproducing apparatus that uses a laser beam to record data on a data recording disc or reproduce data from the recording disc. In particular, it relates to an improvement in the arrangement of a drive unit to move an optical head and the optical head used for recording data or picking up data.

2. Description of the Related Art

Conventionally, in this type of data reproducing apparatus, the movement of an optical head is controlled along a guide in the radial direction of a data recording disc by a drive unit. The drive unit comprises, for example, a voice coil motor body and a bobbin biased by thrust from the voice coil motor body.

To move the optical head rapidly and to control it accurately, the resultant force point of the drive force generated by the voice coil motor body must coincide with the centroid of the optical head. With this in mind, conventionally both the voice coil motor body and the range of movement of the optical head have been arranged in a region on the same side of the position of the spindle motor axis that forms the center of rotation of the data recording disc, which region is bounded by the position of this axis.

With such an arrangement, since the range of movement of the optical head and the voice coil motor body are on the same side, and the space occupied by the voice coil motor body is large, the available area for arranging these items is restricted, even though the voice coil motor body is arranged below the range of movement of the optical head or to the side of the optical head.

Conventionally, therefore, the ability to reduce the size of this type of data reproducing apparatus is limited by the arangement of the optical head drive unit.

SUMMARY OF THE INVENTION

It is an object of the present invention to provide a data reproducing apparatus which is small in size and can move an optical head rapidly and control the movement of the head accurately.

According to one aspect of the present invention, there is provided a disc data reproducing apparatus, comprising means for rotating the disc about a central axis thereof; head means opposite the disc for receiving data from the disc, the head means being disposed on one side of the central axis; and means for moving the head means along a radial direction of the disc, the moving means being disposed on the other side of the central axis.

Preferably, the head means also includes guide means for guiding the movement of the head means by the moving means.

The apparatus further includes a connecting member for connecting the head means and moving means to transfer the moving force of the moving means to the head means.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings of which:

FIG. 4 is a perspective view showing a drive base mechanism, which is a component part of the apparatus;

DETAILED DESCRIPTION OF THE PREFERRED EMBODIMENT

One of the preferred embodiments of the present invention will be described with reference to the accompanying drawings.

In the present invention, a data reproducing apparatus, includes a rotating mechanism for rotating a disc about a central axis, an optical head opposite the disc for receiving data from the disc, and a moving mechanism for moving the optical head along the radial direction of the disc. The optical head is disposed on one side of the central axis and the moving mechanism is disposed on the other side of the central axis.

Figure 2:
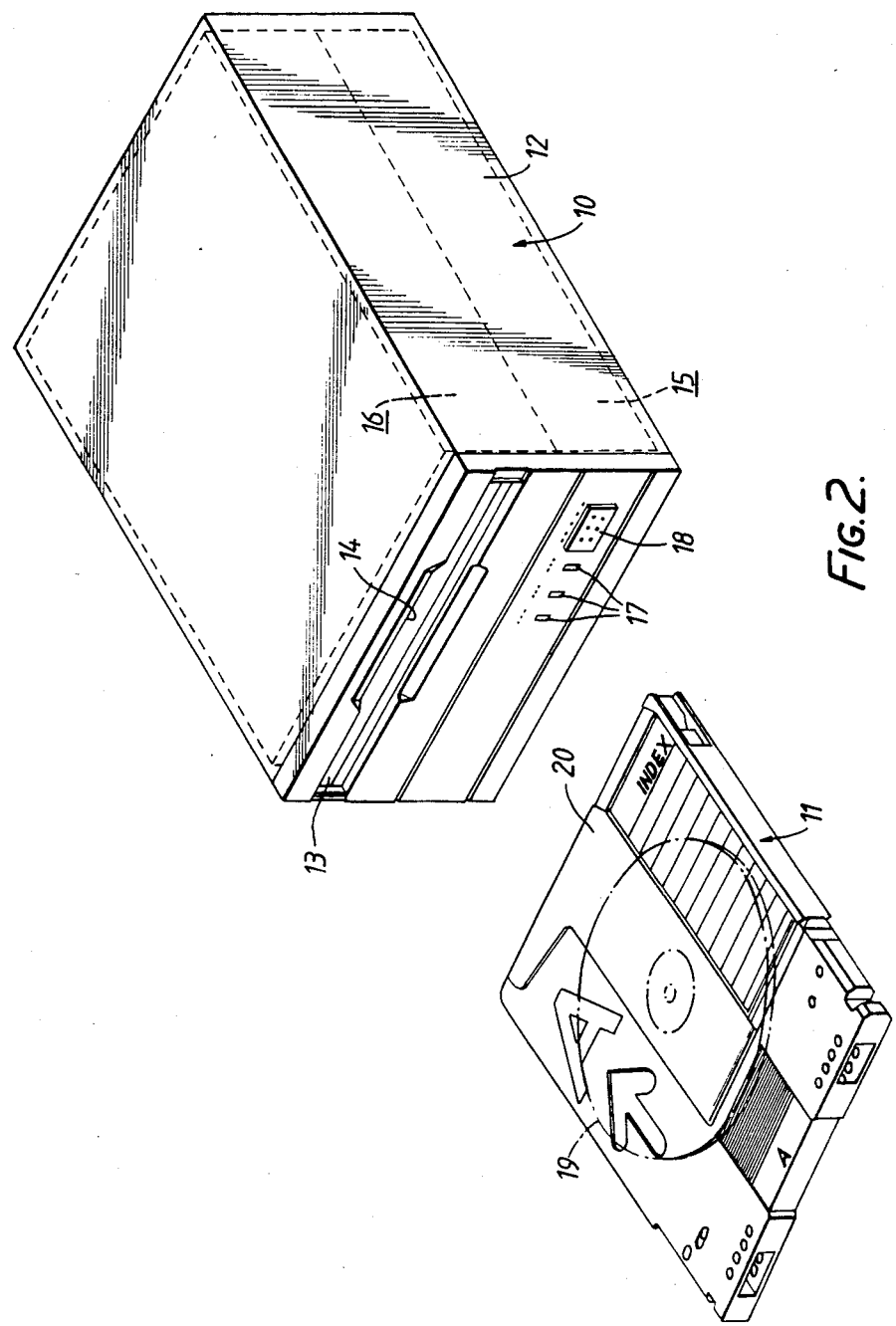
FIG. 2 is an exterior perspective view showing a data reproducing apparatus and a disc cartridge according to the present invention.

FIG. 2 shows an exterior view of a data reproducing apparatus 10 and a disc-containing cartridge 11 for use with this apparatus. The construction of reproducing apparatus 10 is as follows. At the front surface of a main body 12, a port 14 is formed and a shutter 13 is mounted to open and close port 14 for the insertion/removal of disc-containing cartridge 11. Inside main body 12 are housed a drive base mechanism 15, a loading mechanism 16, and a control circuit (not shown). A state indicator 17 and a cartridge eject switch 18 are disposed at the bottom right of the front of body 12. State indicator 17 indicates an apparatus operation state, a ready state or a cartridge inserted state. Cartridge eject switch 18 is pressed by an operator to eject disc cartridge 11 from main body 12 through port 14.

Disc-containing cartridge 11 (referred to below as "cartridge") has incorporated within it an optical disc 19 (referred to below as "disc"). Disc 19 has an outer diameter of about 130 mm. On each surface A and B of disc 19 a data layer is formed to reproduce data with a laser beam or the like. Cartridge 11 is also provided with a sliding shutter 20 for opening a window (not shown) which exposes a part of disc 19.

Figure 3:
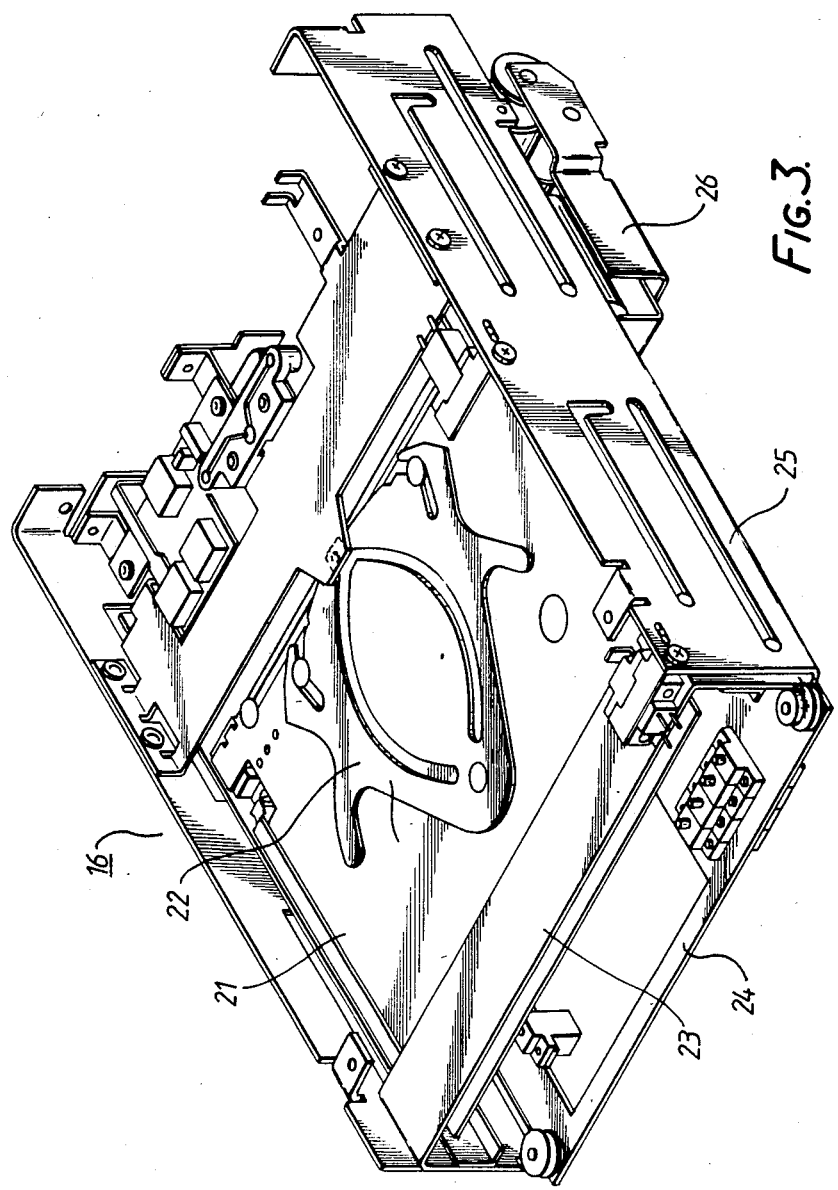
FIG. 3 is a perspective view showing a loading mechanism in a data reproducing apparatus.

Loading mechanism 16 is constructed such as shown in FIG. 3. It comprises a cartridge holder 21 for holding cartridges 11; a cartridge shutter opening mechanism 22 which is incorporated in cartridge holder 21 for opening and closing shutter 20 of cartridge 11; a movable cam member 23 that moves cartridge holder 21 to a prescribed position; loading guide plates 25 on both sides of a loading base 24 that guide movable cam member 23; and a loading motor unit 26 that constitutes the power source for driving movable cam member 23.

Drive base mechanism 15 is arranged below loading mechanism 16 as shown in FIG. 2.

Drive base mechanism 15 is constructed as shown in FIG. 4. On a disc base 30, a spindle motor 31 is mounted. Spindle motor 31 includes a rotating shaft 31a on which disc 19 is mounted. Also a drive unit 32 is mounted on disc base 30 to move a reproducing head 33 (referred to below as "optical head") in the radial direction of disc 19 to process data from the data layer on the underside of disc 19.

Figure 5:
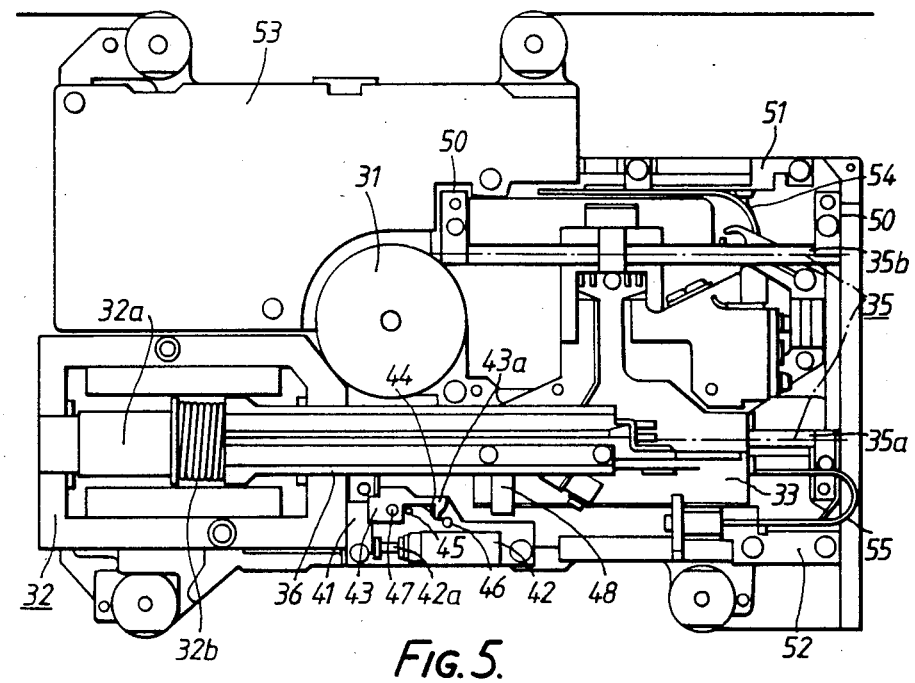
FIG. 5 is a bottom view showing a drive base mechanism in a data reproducing apparatus.

FIG. 5 shows the back of drive base mechanism 15. Optical head 33 is integrated with a light source (not shown) that generates a laser beam, an object lens 34 (see FIG. 4) that focuses the laser beam onto disc 19 in cartridge 11, and a detector that detects the reflected laser beam from disc 19. This optical head 33 is arranged so as to be capable of movement along a sliding shaft assembly 35 in the radial direction of disc 19. Sliding shaft assembly 35 comprises a main sliding shaft 35a and a sub-sliding shaft 35b. Main sliding shaft 35a guides linear movement of optical head 33 and sub-sliding shaft 35b acts to restrict rotation of optical head 33 about shaft 35a.

Figure 1A:
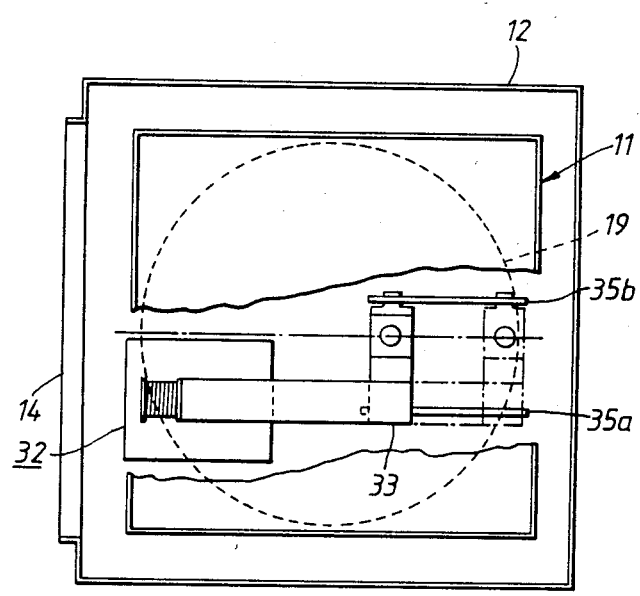
FIG. 1A is a plan view schematically showing the arrangement of an optical head and a drive unit in a data reproducing apparatus according to the present invention.
Figure 1B:
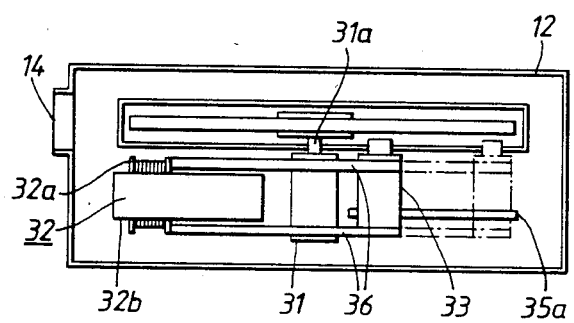
FIG. 1B is a side view schematically showing the arrangement of an optical head and a drive unit in the data reproducing apparatus shown in FIG. 1A.

In order to move optical head 33 there is provided drive unit 32 including a voice coil motor body 32a and bobbin 32b. This drive unit 32 is coupled with optical head 33 through a pair of connecting rods 36 to confine optical head 33 to movement in the direction of main sliding shaft 35a, as shown in FIG. 1B. The range of movement of optical head 33 along shaft 35a is limited to a first side of rotating shaft 31a. The first side being defined by a line passing through rotating shaft 31a between opposite outer edges of disc 19. Thus, the first side as defined herein may be visualized as a semicircle defined by the outer edge of disc 19 and diametrical line passing through shaft 31a. Voice coil motor body 32a is positioned on a second side of shaft 31a opposite the first side.

Figure 1C:
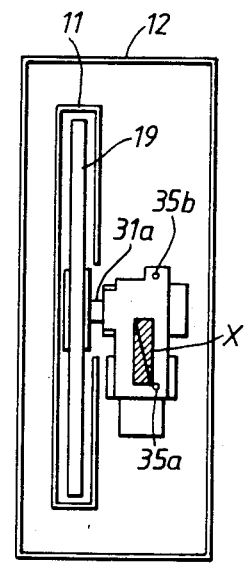
FIG. 1C is a rear view schematically showing the arrangement of an optical head and a drive unit in the data reproducing apparatus shown in FIG. 1A.

Optical head 33, main sliding shaft 35a, sub-sliding shaft 35b and drive unit 32 are arranged such that a resultant force is applied to the shaded imaginary rectangle X illustrated in FIG. 1C whose diagonal preferably is the line joining the center of gravity of optical head 33 and the axis of main sliding shaft 35a.

As shown in FIG. 1B, connecting rods 36 are axially arranged on either side of main sliding shaft 35a and the line of extension of this shaft.

A locking device is provided in order to maintain optical head 33 in the locked state during transportion of the data reproducing apparatus 10, or while operation of the apparatus is halted.

Figure 6:
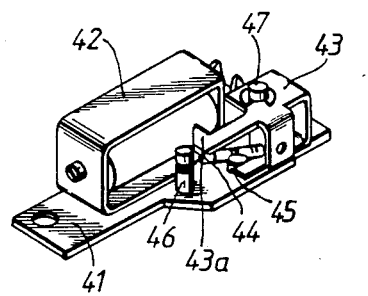
FIG. 6 is a perspective view showing an auto-lock mechanism in a data reproducing apparatus.

The major part of this auto-lock device is constituted by a solenoid 42 and a hook member 43. This major part is shown in FIG. 6 and the whole auto-lock device is shown in FIG. 5. In more detail, in this auto-lock device, optical head 33 is put in locked condition by hook member 43 arresting a catching member 48 by the action of a spring 44.

Solenoid 42, whose a plunger 42a is thus coupled with hook member 43, effects locking and unlocking of plunger 42a in response to changeover of an applied pulse. That is, maintenance of the locked state of plunger 42a is achieved by a permanent magnet (not shown) arranged at the rear of plunger 42a. While unlocking of plunger 42a is achieved by withdrawing plunger 42a by means of an electromagnet (not shown) which generates a magnetic force whose direction is such as to oppose the permanent magnet. Consequently, when plunger 42a is released either by stopping the application of a pulse to the electromagnet, or by applying a pulse such that the direction of magnetization of the electromagnet is the same as that of the permanent magnet, plunger 42a returns rearwardly due to the action of spring 44, thereby creating a locked condition.

In FIGS. 5 and 6, on a base plate 41, solenoid 42 is mounted and a projection 45 is projected for readjusting the rotation of hook member 43. Spring 44 is stretched between hook member 43 and a pin 46 mounted on base plate 41. hook member 43 is rotatable about a shaft pin 47. Reference number 50 denotes fixing members for fixing sub-sliding shaft 35b on disc base 30, 51 and 52 denotes guide members for guiding the movement of flexible cables 54 and 55, and 53 donotes a spindle motor base plate.

As described above, in the present invention, a distributed arrangement is adopted wherein the range of movement of optical head 33 is disposed on one side of shaft 31a of spindle motor 31, which corresponds to the central axis of disc 19, while voice coil motor body 32a, which constitutes the major part of drive unit 32, is disposed on the other side of shaft 31a of spindle motor 31. Thus, the spaces on each side for accommodating the components can be made as small as possible as shown in FIG. 1A.

Furthermore, since drive unit 32 and optical head 33 are united by connecting rods 36 in such a way that the resultant feed force that biases optical head 33 from drive unit 32 acts within the imaginary rectangle X shown in FIG. 1C, there is scarcely any wastage of this resultant feed force.

Also, since connecting rods 36 are arranged symmetrically above and below a main sliding shaft 35a and the line of extension of this shaft (see FIG. 1B), no unnecessary bending stresses are applied to connecting rods 36, so drive unit 32 and optical head 33 are securely connected by connecting rods 36. Thus, optical head 33 can be moved rapidly and controlled accurately by drive unit 32.

Various other modifications could be made in the present invention without departing from the scope or spirit of the following claims.

What is claimed is:

1. A disc data reproducing apparatus, comprising:
   a housing;
   means for rotating a data disc about a central axis;
   head means, spaced from one side of the disc and positioned within said housing, for receiving data from the disc, said head means being disposed on one side of an imaginary line passing through said central axis;
   means, having an elongated axis, for supporting and slidably guiding the movement of said head means; and
   means for moving the head means along a radial direction of said disc, said moving means being disposed on the other side of said imaginary line;
   said moving means, said supporting means, and said head means being arranged such that a resultant force of said moving means is applied within a rectangular having a diagonal extending between the center of gravity of said head means and the axis of said support means.

2. The apparatus of claim 1 wherein said rotating means includes a spindle motor having a rotating center shaft coincident with said central axis.

3. The apparatus of claim 1 wherein the head means is an optical head.

4. The apparatus of claim 3, including guide means for guiding the movement of the optical head by the moving means.

5. The apparatus of claim 1 wherein the moving means includes a voice coil motor.

6. The apparatus of claim 5 further including a connecting means for connecting said head means and said moving means to transfer the moving force of said moving means to said head means.

7. The apparatus of claim 6 wherein said supporting means includes a main sliding shaft for supporting said slidably guiding the movement of said optical head by said moving means and a sub-sliding shaft operably connected to said head means to restrict rotation of said head means about said main sliding shaft.

8. The apparatus of claim 7 wherein the connecting means includes a pair of connecting rods disposed on opposite sides of said main sliding shaft.

* * * * *